Sept. 17, 1968 W. E. YOUNG ET AL 3,402,088
METHOD FOR BONDING PLASTIC
Filed Sept. 23, 1965 3 Sheets-Sheet 1

INVENTORS
WILLIAM E. YOUNG
ROBERT O WOLFELSPERGER
PATRICK J. PINTO
BY Ralph R Roberts
AGENT

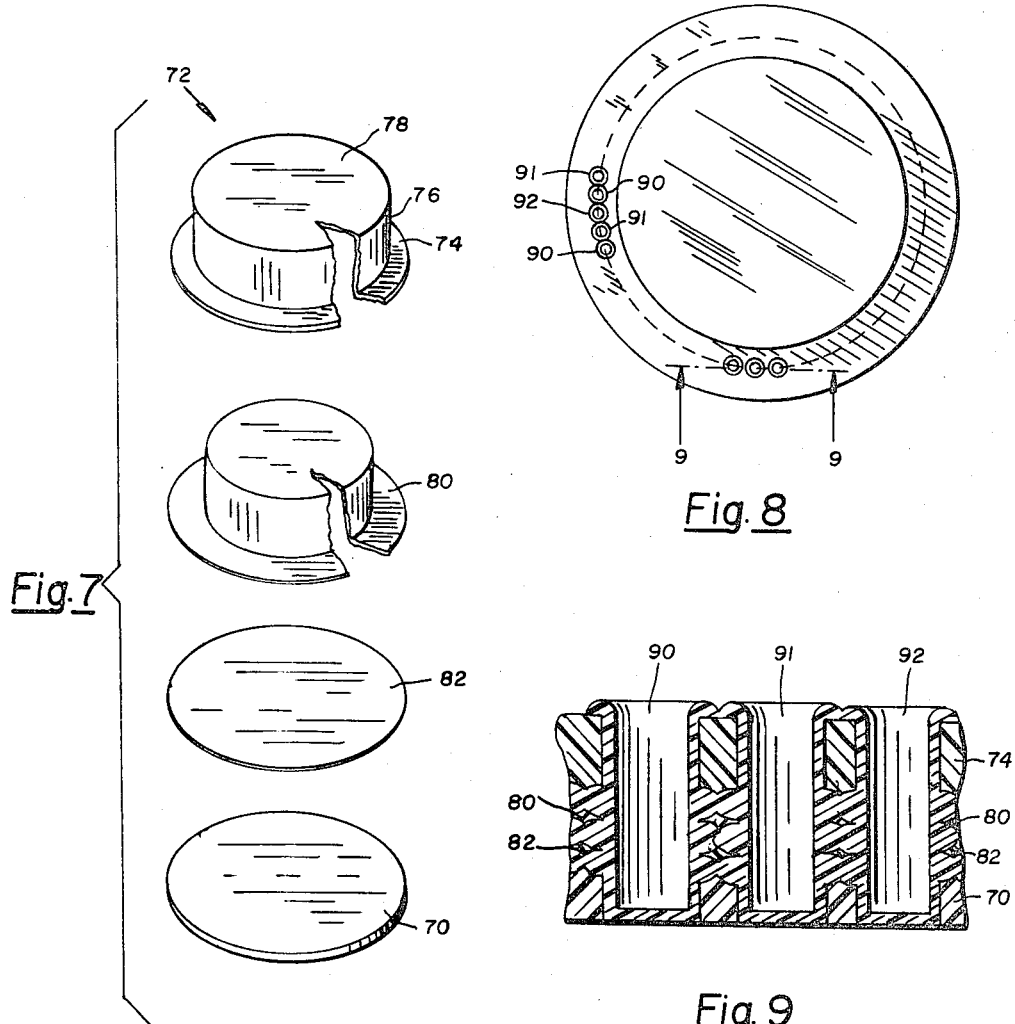
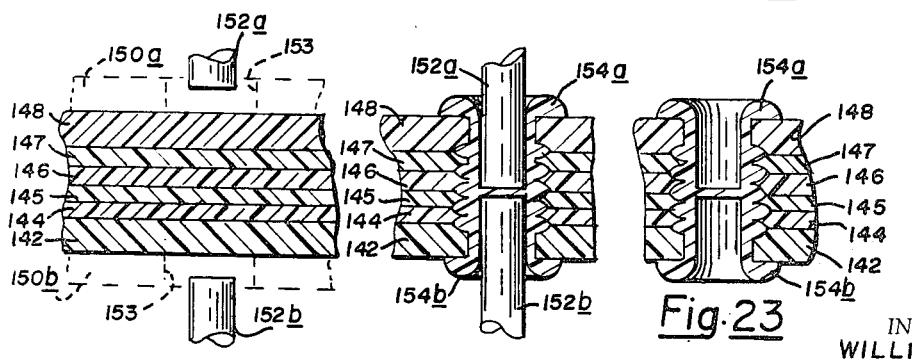

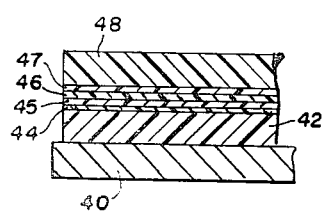
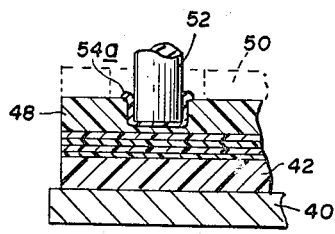
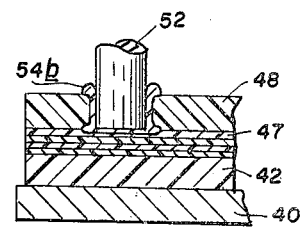
Fig. 10  Fig. 11  Fig. 12
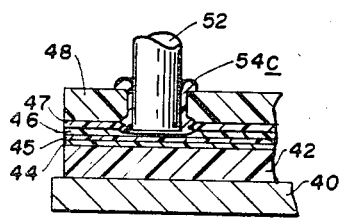
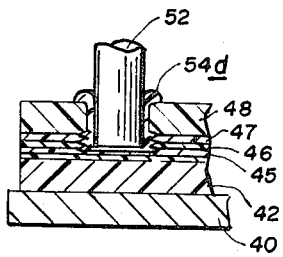
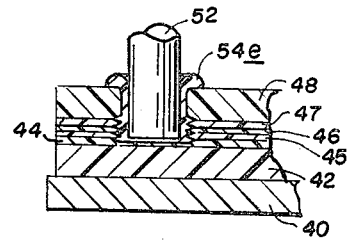
Fig. 13  Fig. 14  Fig. 15
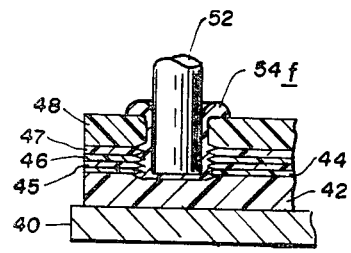
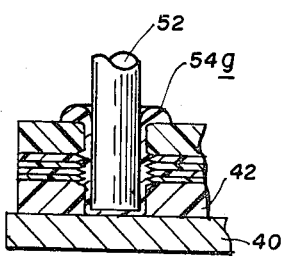
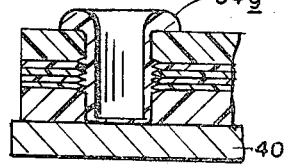
Fig. 16  Fig. 17  Fig. 18
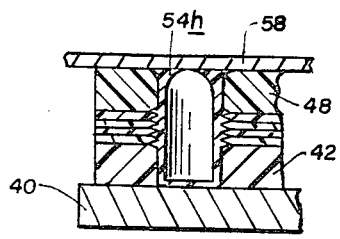
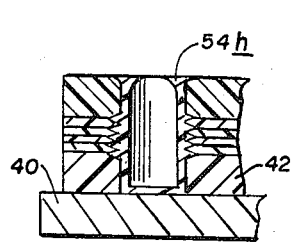
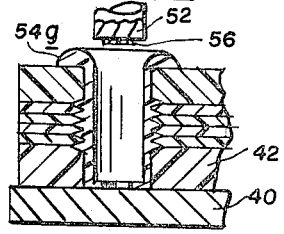
Fig. 19  Fig. 20  Fig. 18A United States Patent Office 3,402,088
Patented Sept. 17, 1968

3,402,088
METHOD FOR BONDING PLASTIC
William E. Young, 52 Sea Beach Drive, Stamford, Conn. 06902; Robert O. Wolfelsperger, 23 Glenroy Road, Fairfield, N.J. 07006; and Patrick J. Pinto, 73 Ozone Ave., Cedar Grove, N.J. 07009
Filed Sept. 23, 1965, Ser. No. 489,574
4 Claims. (Cl. 156—268)

ABSTRACT OF THE DISCLOSURE

A method for joining at least two plies of thermoplastic material to one another at portions other than their edges. The method includes arranging and holding a plurality of thermoplastic sheets on a cooled support platen which is maintained at a temperature less than the melting point of the thermoplastic sheets being joined. A heated plunger having a flat tip end is advanced at a predetermined rate into the thermoplastic material, the heated tip melting the plastic and as the tip advance comingles the melted plastic. The advance of the heated plunger is stopped when the tip has entered at least part way into the bottommost layer of material. The heated tip is then withdrawn and the melted portion of plastic is cooled to provide a tubular weld.

This invention relates to the joining or bonding of sheets or laminae of thermoplastic material to one another and particularly to the means, apparatus and product produced by heated plunger joining of thermoplastic sheets.

Even more particularly this invention relates to the joining or bonding of thermoplastic sheets which may be of dissimilar thickness and/or of different compositions, this joining being accomplished by means of a plunger member heated to a predetermined temperature.

Even more particularly, this invention relates to a method and apparatus for the joining of a plurality of plies of plastic sheet material, this joining being performed at a selected number of locations and at a predetermined distance from the edge of the material. This joining is accomplished regardless of the presence of dirt and/or other contaminants on the surface of the plastic sheets and further the joining also effectively bonds light gauge sheets to each other and where desired to sheets of other thicknesses and even sheets of substantial thickness.

Certain controllable plastic behavior was observed in the preparatory work and experiments necessary to perfect the technique for edge sealing of thermoplastic material, the method and apparatus pertaining thereto being disclosed in U.S. Patent application Ser. No. 342,020 filed Feb. 3, 1964, now U.S. Patent 3,342,817 and Ser. No. 342,302 filed Feb. 3, 1964. Many tests and controlled experiments have proved the practical means for heated plunger sealing of thermoplastic laminae in which controlled "counterflow" of melted plastic is used to seal plastic sheets at other than their edges.

Heretofore joining of thermoplastic sheets of uneven thicknesses and of dissimilar material has required very elaborate preparation of the contacting surfaces and often additional and/or auxiliary material. The resulting joint has all too often proved unreliable and of low strength. In particular the joining or bonding of plastic sheets, mouldings or extrusions of different thicknesses has been most troublesome where the heat for joining these members must be supplied through the thicker member. This arrangement is often necessary because of the configuration of the sealing members, apparatus arrangement or of the sequential placement of the plastic laminae. Of additional note is the prior difficulty of joining sheets of different plastic materials to one another. Materials such as polyethylene and polypropylene either or both of which may be coated with Saran (polyvinylidene chloride) film are by present methods joined to produced weak seals when the Saran is on the side of the sheets to be sealed to each other.

It is an object of this invention to overcome the above problems and to provide a sure method for the joining or bonding of laminae of thermoplastic material. It is a further object to provide a method for the joining or bonding of thermoplastic laminae of dissimilar thicknesses and/or dissimilar compositions.

It is a further object of this invention to provide a method for the joining or bonding of thermoplastic sheets arranged in multi-layers which may be of dissimilar thicknesses and with no special preparation of the surfaces of the sheets to be joined.

These and other objects and advantages of the invention will be set forth in part hereinafter and in part will be obvious herefrom, or may be learned by practices with the invention, the same being realized by the detailed description to follow and by means of the method and instrumentalities and combinations pointed out in the appended claims.

The invention consists in the novel method herein shown and described and in a broad aspect includes a metal plunger which is of a preselected size and configuration said plunger being brought to and maintained at a predetermined temperature. Two or more sheets of thermoplastic are brought into plied relationship and are maintained in a controlled relationship with each other. The plunger, heated to a temperature in excess of the melting point of the plastic, is then advanced at a selected speed into and through all but the bottom ply of plastic sheets. The plunger enters but is stopped short of passing through the bottom ply of plastic. In the course of advancement, the distal flat end of the heated plunger, moving at a controlled and selected speed, melts the thermoplastic material in contact with and in close proximity to the flat face and sides of the advancing plunger. By supporting the material to be joined on a cool platen or plate, and by stopping the plunger short of this platen, the melted plastic displaced by the advancing plunger is moved upwardly and outwardly in a counter-flow direction. The cool platen may also be made to serve as a positive stop for the advancing plunger since the cool platen will maintain between the plunger and platen a contiguous separating film of plastic on the platen's plastic supporting surface. The plies of material, if thin, are held by a plate having apertures therein. This plate is spaced from the bottom platen in a manner such that each ply of material will be held in close proximity to each other yet will not be so tightly pressed that the viscous fluid plastic is prevented from flowing a short distance between plies. Where the top ply is a heavy plastic sheet, as for example, one-sixteenth of an inch, the top ply may be held by other clamp means and the top ply as it is pierced by the plunger will provide and act as an apertured plate.

In operation, the heated plunger is advanced through an aperture in the clamping plate or is advanced to and through the heavy top ply. Upon entering the second and successive plies the plunger, as it melts the plastic, also displaces the plastic and causes it to flow upwardly and also outwardly a short distance between plies. The cool support plate or platen insures that the displaced fluid plastic will only flow upwardly and/or outwardly and as the fluid flow of plastic is more or less confined, the fluid flow will exert a certain amount of hydraulic pressure during the flow thereof. Under the influence of the hydraulic pressure the fluid plastic will flow outwardly from the plunger and between the plies of sheets and upwardly around the plunger. Such a flow is here defined as "counterflow" and during the flow thereof the molten plastic derived from the several plies comingles and forms, for all practical purposes, a homogeneous plastic bond which, when the plunger is withdrawn, solidifies and forms a strong bond with each ply and with itself. Contamination of surfaces by dirt and other material has little or no effect on the joining of the plastic laminate by this method. The stream of molten plastic under pressure either washes or pushes the contaminants out of the way or encapsulates the contaminants. In the case of Saran surfaced polypropylene the Saran is readily pushed from the path of the heated plunger. Seals of moderate strengths as by the method of this invention have also been obtained between sheets of polyethylene where a lamina as dissimilar as fifty gauge oriented polyester film has been interposed. Seals may also be made by this method between certain thermosetting plastics while they are still in their thermoplastic state.

By selectively spacing the applications of the plunger to the plies of plastic it is possible to form a hermetically sealed joint. The shape of the plunger can be formed so as to provide any desired pattern of sealing or bonding.

It is also possible that the plies of plastic to be joined may be so thick that a plunger having a desired small configuration will be unable to sustain a desired temperature at the tip as said tip is advanced into the plastic. When the heat in the tip becomes too far reduced the plunger will be unable to penetrate the plastic at the desired rate. When this becomes the situation, the design of the joining apparatus and the method of joining can include opposed heated plungers each advancing toward the other through opposite sides of the plastic pile, each plunger being advanced at a selected speed and including means to limit its advance to a preselected point.

There has thus been outlined rather broadly the most important features of the present invention in order that a detailed description thereof that follows may be better understood and in order that the present contribution to the art may be better appreciated. There are, of course, additional features of the invention that will be described hereafter. Those persons skilled in the art will appreciate that the concept on which the present disclosure is based may readily be utilized as the basis for comparable methods for carrying out the several purposes of this invention. It is important, therefore, that the novel features, as to the method, which are believed to be characteristic of this invention and which are set forth with particularity in the appended claims, be regarded as including such equivalent method as do not depart from the concept and scope of this invention. The invention itself, however, both as to its organization and method of operation, together with further objects and advantages thereof, may best be understood by reference to the following description taken in connection with the accompanying drawings, in which:

FIG. 7 represents an exploded isometric view of a plurality of sheets of plastic arranged to be joined to form a hermetically sealed package similar to the package of FIG. 1;

FIG. 8 represents a plan view of a package assembled from the components shown in FIG. 7 and joined by the method and apparatus of this invention;

FIG. 9 represents an enlarged sectional view taken on the line 9—9 of FIG. 8 and showing the method of forming a hermetic seal;

FIG. 10 represents a diagrammatic fragmentary cross section showing multi-layers of plastic arranged for joining and lying on a cool platen;

FIG. 11 represents a diagrammatic fragmentary cross section showing in phantom outline an apertured clamp plate resting on the plies of plastic and with a heated plunger having been advanced into the top ply of plastic;

FIG. 12 represents a diagrammatic fragmentary cross section of the plastic plies and platen of FIG. 10 and with the heated plunger having been advanced through the heavy top ply of plastic;

FIG. 13 represents the cross-sectional view of FIG. 12 with the heated plunger having been advanced through the first of four thin plies of plastic;

FIG. 14 represents the cross-sectional view of FIG. 13 with the heated plunger having been advanced through the second of four thin plies of plastic;

FIG. 15 represents the cross-sectional view of FIG. 14 with the heated plunger having been advanced through the third of four thin plies of plastic;

FIG. 16 represents the cross-sectional view of FIG. 15 with the heated plunger having been advanced through the fourth of four thin plies of plastic;

FIG. 17 represents the cross-sectional view of FIG. 15 with the heated plunger having been advanced in the bottom heavier ply of plastic to a point near the cool support platen;

FIG. 18 represents the cross-sectional view of FIG. 17 but with the heated plunger withdrawn from the plastic plies;

FIG. 18A represents the cross-sectional view of FIG. 17 but with the heated plunger withdrawn from the plastic plies and with a portion of the plastic film of the bottom ply being shown adhered to the end of the withdrawn plunger;

FIG. 19 represents the cross-sectional view of FIG. 18 with a cool press plate engaging the counter flow bead of plastic extending above the top ply of plastic, the press plate having pushed the bead into the cavity formed by the withdrawn plunger;

FIG. 20 represents a cross-sectional view of the joined plastic sheets of FIG. 19 as seen in a finished condition;

FIG. 21 represents a fragmentary sectional view of an array of plastic sheets or plies prior to joining by a pair of opposed heated plungers;

FIG. 22 represents a fragmentary sectional view of the plastic plies of FIG. 21 and with the opposed plungers substantially at their limit of advance; and FIG. 23 represents a fragmentary sectional view of the completed weld of the plastic assembly of FIG. 22 and with the opposed plungers withdrawn from the weld.

Figure 1:
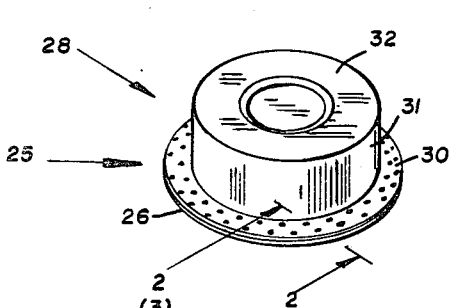
FIGURE 1 represents an isometric view of a plastic outer wrap or package wherein two plastic members are joined by the method and apparatus of this invention.
Figure 2:
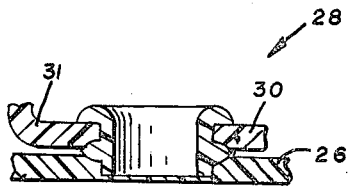
FIG. 2 represents a fragmentary view showing in section a joined portion of the package of FIG. 1, the package being formed of two relatively heavy plastic sheets and the view taken on the line 2—2 of FIG. 1.
Figure 3:
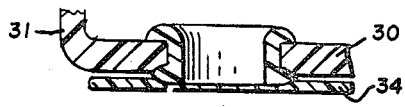
FIG. 3 represents a fragmentary sectional view similar to that of FIG. 2 and taken on the line 3—3 of FIG. 1, the package being formed from a thick upper and a thin lower plastic sheet.

Referring now to the drawings wherein similar characters designate corresponding parts throughout, there is shown in FIGS. 1–3 a highly successful method of packaging a real or coil of wire. In this commercial reduction to practice the overwrap or package as assembled and designated 25 as seen in FIG. 1 is, in commercial use, adapted to encapsulate a coil of wire arranged to be paid out while the operator is walking or being transported at various speeds. As exemplified, and seen in FIG. 2, a base member 26 is of a relatively flat configuration while the cover member 28 is a shaped piece of thermoplastic having a flange portion 30 from whence upwardly extends a cylindrical portion 31 terminating in an end or cover extending portion 32 which may have its central portion depressed a small amount. This cover conforms closely to the coil of wire being packaged as it has been found highly satisfactory to heat and vacuum form cover 28 over the coil of wire while still warm and pliable, then join flange portion 30 and base member 26. In the process of joining, base member 26 and flange 30 are brought into face-to-face relationship and a heated plunger is advanced into the plies of plastic, the heated plunger as it is advanced being used to form the weld in a novel manner to be hereinafter more completely described.

In FIG. 3 the base member 26 (FIG. 2) has been replaced by a thinner base member 34. This new base member is perhaps one-half or less the thickness of flange portion 30. As in FIG. 2 a heated plunger is used to make the weld to be hereinafter described in detail.

Figure 4:
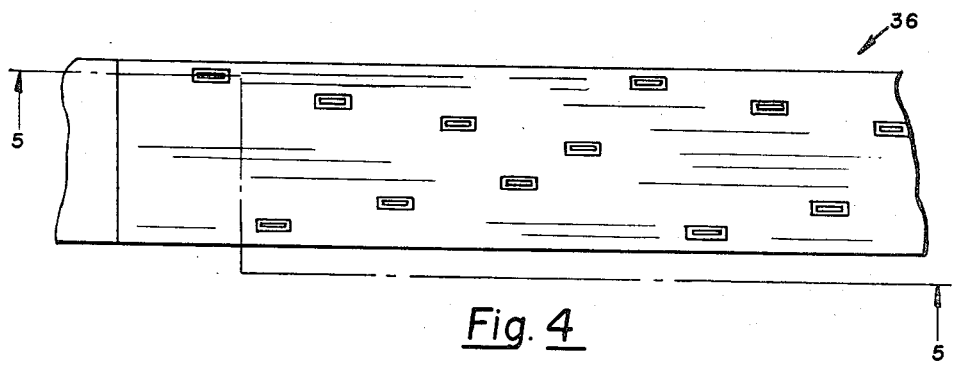
FIG. 4 represents a plan view in slightly enlarged scale of a plastic strap joined by the method and apparatus of this invention.
Figure 5:
FIG. 5 represents a side view of the strap of FIG. 4 with a portion taken in section, the view taken on the line 5—5 of FIG. 4.
Figure 6:
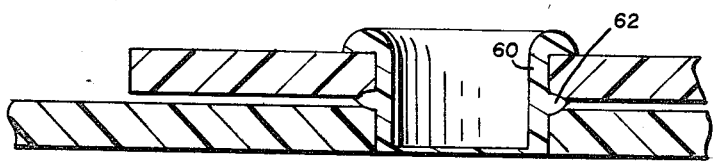
FIG. 6 represents a greatly enlarged sectional view of one of the joined portions shown in FIG. 4.

In FIGS. 4–6 is shown another practical commercial application of this invention in which a band or strip of thermoplastic 36 is lapped upon itself. As reduced to practice, the band is of highly oriented polypropylene whose base material may be supplied by Hercules Powder Co., Inc., of Wilmington, Del. A plurality of spaced applications by a heated plunger provides a selected number of bonds, which bonds are oriented in respect to each other and also in the direction of orientation of the polypropylene so as to give a precise effect. In this particular application the oriented polypropylene is nominally one-half inch wide and twenty thousandths of an inch thick. In this particular plastic and application the oriented polypropylene has a tensile strength of about sixty thousand pounds per square inch resulting in a band or strap having a breaking strenth of about six hundred pounds. The selective joining, as shown, results in a joined strap having a pull strength of about two hundred to four hundred eighty pounds or more. If sealing temperature heat is allowed to penetrate into other than the joining areas of the band 36 the strength of the oriented polypropylene is lost and a tensile of about eight thousand pounds per square inch after cooling is the result. Such a strap results in a band having a strength of about eighty pounds and as a strap for packaging is very weak and usually quite unsatisfactory.

The method of joining sheets, moldings, and other lamina of thermoplastic in accordance to the teachings of this invention is shown in FIGS. 10–20. In the sequence here shown for the purpose of illustration, a cool bottom platen or plate 40 carries a bottom sheet or ply 42 of thermoplastic. This sheet 42 may be of polyethylene or polypropylene and may be at least as thick as eighty thousandths of an inch. Immediately above ply 42 are four thinner plies 44, 45, 46 and 47, said plies are also of thermoplastic, and for the purposes of illustration are shown about one-fifth the thickness of ply 42 whereas, in practice, these plies may be even less than one-thousandth of an inch thick. A top ply 48 similar to ply or sheet 42 lies on ply 47. An optional clamp plate 50, seen in phantom outline in FIG. 11, may be used to maintain a predetermined spacing between those plies between said upper clamp plate and the bottom cool platen 40.

A heated plunger 52 has a flat end and is preferably maintained at a temperature from one to three hundred or more degrees F. above the flowing temperature of the plastic laminae to be joined. This plunger seen in FIGS. 11–18A has in FIG. 11 been advanced through an aperture in plate 50 or has been advanced directly to the top thermoplastic ply 48. This plunger is controlled in its rate of advance which control may be by conventional apparatus (not shown) and may consist of no more than a weight applied to the plunger. Obvious equivalent control rate advancement apparatus includes cylinders such as pneumatic and hydraulic or springs of determined bias. As seen in FIG. 11, the heated distal end of the plunger has contacted the ply 48 and has melted the portion of thermoplastic material immediately in contact with the side and distal flat end of the plunger 52. As shown in FIG. 11, viscous thermoplastic material extends across the end of the plunger and as the plunger advances into the ply 48 the displaced viscous thermoplastic material flows up the side of the plunger and, as designated 54a, forms a small bead around the periphery of the plunger. The advance of the plunger is limited by a stop which may be a collar on a rod or an abutment means in way of the movement of a lever.

In FIG. 12 the plunger 52 has been advanced to a point where plies 47 and 48 lie in face-to-face contact. The viscous melted plastic not only continues to flow up the sides of plunger 52 but now some usually flows outwardly from the plunger into the juncture of the two plies. Note that the bead around the plunger has increased through "counterflow" of the viscous plastic material up the sides of the plunger while the rest of the viscous material is disposed in the juncture of the laminae. At this stage of forming the melted plastic is designated 54b.

In FIG. 13 the flat end of the heated plunger 52 has been advanced to a point where plies 46 and 47 lie in face-to-face contact. The viscous melted plastic under hydraulic pressure continues to flow up the sides of the advancing plunger 52 but now through the hydraulic pressure exerted by the advancing plunger pushes viscous melted plastic into the juncture of plies 48 and 47 and plies 47 and 46 while the bead continues to increase in size and is designated 54c.

In FIG. 14 the heated plunger 52 has been further advanced to a point where the distal end of the plunger is at the juncture of plies 46 and 45. The viscous melted plastic under hydraulic pressure continues to flow up the sides of the advancing plunger forming bead 54d and additionally, by hydraulic pressure, tends to push the viscous melted plastic into the junctures of plies 48 and 47, 47 and 46, and the new juncture of 46 and 45. It is to be noted that the "counterflow" of melted plastic from each ply causes intermingling of the plastic making the resulting melted portion relatively homogeneous.

In FIG. 15 the heated plunger 52 has been advanced to a point where the distal end is at the juncture of plies 45 and 44. As above, the hydraulic pressure created by the advancing plunger causes "counterflow" into the juncture of plies 48–47, 47–46, 46–45 and 45–44. The bead around the plunger continues to grow and in this FIG. 15 is identified as 54e.

In FIG. 16 the heated plunger 52 has been advanced to the juncture of plies 44 and bottom ply 42. The hydraulic pressure on the viscous melted plastic is maintained by the advancing plunger which pressure tends to cause viscous plastic to flow into all separations of the plies and to continue "counterflow" causing an increase in the bead designated 54f.

In FIG. 17 the heated plunger 52 has advanced to a point where the distal flat end is near the cool platen 40. This platen being at a temperature less than the melting point of the plastic will have a tendency to prevent complete melting of the plastic that is contiguous to the platen. By keeping unbroken the bottom surface of the bottom ply while the plunger 52 is advanced into the plies of plastic, the confined movement of melted viscous plastic under hydraulic pressure will tend to flow between the plies or in "counterflow" movement upwardly around the plunger. It is to be noted that the platen 40 can be used as a positive stop for the advancement of the plunger. In practice, the cool platen always insures that at least some thin film of plastic is unmelted and will act as a cushion barrier stop.

FIG. 18 shows the heated plunger 52 withdrawn from the stack of plastic laminae. The plunger being at a substantially higher temperature than the melting point of the plastic, said plunger is in effect self-cleaning and is easily withdrawn. The resulting bead 54g and relatively homogeneous tubular melted plastic is then allowed to cool forming a tubular weld of comingled plastic.

It is to be noted in FIG. 18A that on occasion when the heat source for the heated plunger 52 is at a substantial distance from its distal tip, the heated tip portion of plunger 52 when brought adjacent the cooled platen 40 may be cooled sufficiently so that an end portion 56 of plastic may adhere to the tip of plunger 52 as it is removed from the welded stack of plastic. Since the removal of the plunger 52 from the plastic stack is after the hydraulic flow of viscous material forming the weld has been completed, the disruption of the bottom surface of ply 42 is after the fact and does not affect the prior formed plastic weld.

It is to be noted that for the purpose of illustration and explanation the FIGS. 2, 3, 6 and 9 through 23 inclusive, show an interface line between the plies and weld. This interface line and the various cross-hatchings show a joint which is only a suggestive point of homogeneous juncture of the welding of the weld and the plies. In FIG. 2, for example, the lines and cross-hatching showing plies 26, 30 and the weld actually is a homogeneous mingling of ply 30 to the weld and ply 26 to the weld. There is actually no joint in the weld material between the plies and the weld to the plies as it is an intent of this invention to provide a weld that is homogeneous with the plies and the weld. The weld and plies joined in this manner is intended to be as strong as the material welded and any interfaces accidentally formed are of short and irregular formation and duration.

On occasion it is desirable to smooth the top surface of the top ply 48 subsequent to the withdrawal of the plunger from the just formed weld. One method of smoothing the weld is shown in FIG. 19 wherein a plate 58 preferably of cooled metal is pressed downwardly onto the upper surface of top ply 48 whereby bead 54 is urged into the cavity formed by the withdrawn plunger, said bead taking the form 54h as seen in FIG. 19. After removal of the plate 58 the weld will appear similar to FIG. 20. The smoothing of the weld is usually while the bead 54 is still in a heated condition and most easily moved.

Referring once again to FIGS. 2–3, it is to be noted that the plunger 52 or a similarly heated plunger can make the weld of FIGS. 2 and 3. In FIG. 2 the members 26 and 30 may be of either polypropylene and/or polyethylene either or both of which may have a Saran or similar coating on their facing surfaces. The thicknesses of each of these members may vary from twenty or less to more than eighty thousandths of an inch thick. In FIG. 3 is shown the application whereby the top flange 30, as reduced to practice, is eighty thousandths of an inch thick and the thinner base member 34 is thirty thousandths of an inch thick. It is to be noted that to facilitate assembly the plunger is first moved through the thicker flange piece 30.

In FIGS. 4–6 the heated plunger is a plurality of rectangularly shaped heated metal pins arranged in a precise pattern so that no two plunger welds are in the same transverse pattern. In one instance of the practical application of this invention shown in these FIGS. 4–6, the plungers are one-thirty second inches wide by one-eight inches long. The wall 60 (FIG. 6) of the weld made in the oriented polypropylene is estimated at about one-sixty fourth inches. The lateral fin 62 may extend about another sixty-fourth into the space between the lapped portions of band 36.

In FIG. 7 is shown a modification of the package of FIG. 1. Base member 70 is like base member 26 and cover member 72 is like cover member 28 with a corresponding flange portion 74, cylindrical portion 76 and end cover 78. In this particular application it is desired to make the package hermetically sealed to prevent water from entering the package and subsequently in storage and use becoming frozen with the ice so formed perhaps damaging the package or the wire encapsulated therein or interfering with its unwinding. An optional thin cover member 80 formed to fit inside cover member 72 is made of polyethylene or other suitable material of about ten thousandths of an inch in thickness. A cover member 82 also of polyethylene and about ten-thousands of an inch thickness is of a diameter suitable to fit between flange 74 and base 70. The wire may be placed on base member 82 and cover member 80 attached thereto. This assembly may then be placed in cover member 72 and with the flange portions of the cover members 72 and 80 lying on base members 82 and 70 the four thicknesses of plastic are brought into face-to-face relationship and heated plungers applied in the manner of FIGS. 10–20 to form joined portions.

In the plan view of FIG. 8 is seen a circular pattern of plastic welds arranged in sequence and close proximity to each other so as to intermingle and form a hermetic seal. As an exemplification of a typical application, the pattern of plastic welds 90, 91 and 92 are repeated around the flange portion of the package to form a complete circular path. This complete pattern of welds can be formed in one operation by having a circular row of heated plungers arranged to provide the pattern 90, 91 92 and repeat this pattern as many times as necessary to complete the circle. This pattern can also be formed by one or more spaced plungers. If a single plunger were to be used, alternate welds 90, 92 etc. could be made around the flange and then the intermediate welds 91 could be made to form the comingled welds as shown in the enlarged view of FIG. 9. The sequence of welds shown in FIG. 8 often are made in two steps whereby a circle of spaced and heated plungers form a circle of welds 90 and 92. When welds 90 and 92 are completed the plungers are advanced to intermediate positions by rotating the piece or apparatus. Weld 91 is then made intermediate each of the welds 90–92 and as they are made the plunger exerts pressure to flow the plastic laterally until stopped by welds 90–92. The series of comingled plastic welds seen in section in FIG. 9 forms a hermetic seal when the plastic flows between members 74–80, 80–82 and 82–70. When arranged in close proximity to each other the sequence of welds 90, 91 and 92 etc. provide interconnected lateral connections which, as exemplified, are three layers of interconnected rings.

FIGS. 21–23 illustrate a solution to a problem that may arise when the plunger is limited in size and/or of extended length. This limitation may occur for any number of reasons among which are aesthetic appearance or design considerations. The small plunger of extended length, as it is advanced into the plastic plies does lose heat from the tip of the plunger to the surrounding plastic. This heat loss may cool the plunger tip to a temperature at or below the melting point of the thermoplastic whereupon the plunger is unable to advance into the plastic. In FIGS. 21–23 is shown an arrangement in magnified scale in which opposed plungers are advanced toward each other. These plungers designated 152a and 152b as arranged in FIG. 21 are disposed to move toward each other through apertures 153 which are provided in upper clamp plate 150a and lower clamp plate 150b shown in phantom outline. As seen in FIG. 21 the bottom ply 142 similar to thermoplastic ply 42 carries four thinner plies 144, 145, 146 and 147 which plies are similar to thermoplastic plies 44, 45, 46 and 47 in FIG. 10. A top ply 148 is similar to top ply 48 and is held in a selected position by upper clamp plate 150a.

As seen in FIG. 22, each of the plungers 152a and 152b have been advanced toward each other, the advance being stopped at a point near the center of the plies of thermoplastic. As each of the advancing plungers acts as a platen for the other plunger, so as in the manner of the method of FIGS. 10–20, is the flow of molten viscous plastic limited to the "counterflow" up the sides of each plunger 152a and 152b and to the flow of viscous molten plastic into the junctures of the plies 148–147, 147–146, 146–145, 145–144 and 144–142. A portion of the molten plastic not forced into these junctures form upper and lower beads 154a and 154b and in the manner of FIGS. 10–20 can be smoothed or left as formed. The resulting weld shown in FIG. 23 is merely an illustration of the forming of one weld in which a symmetrical arrangement of plastic laminae and equal size plungers results in a symmetrical weld. Because of design considerations or a different arrangement of plies it may be desirable to form an unsymmetrical weld. This form of unsymmetrical weld may be necessary because of physical factors such as the design of the package requiring a selected disposition of the strength ply or the strain exerted on the weld by the article being packaged requires the strength of the weld to be selectively placed. The apparatus controlling the penetration of the plungers 152a and 152b can be arranged to provide a limit to the advance of each plunger so as to satisfy the particular condition of weld desired or required.

USE AND OPERATION

In particular the apparatus for sealing plies of plastic as exemplified in the various figures provides for the plies of plastic to be laid in face-to-face relationship to one another and to be retained in a restricted yet not tightly pressed relationship to one another. In particular, as shown and described above, the top outermost ply of thermoplastic is usually of heavier gauge than the lower or intermediate plies or at least some of the lower plies. The plies of thermoplastic being welded may be dissimilar both as to material and/or thickness. In forming the weld described above the use of a heated plunger whose distal tip temperature is about six to seven hundred degrees F. provides for melting and viscous flow of commingled plastic in "counterflow" to the advancement of the heated plunger. This novel "counterflow" by hydraulic pressure exerted on the viscous melted plastic permits the joining of somewhat dissimilar plastics and obviates the necessity of controlled clearing of surfaces and other conditions usually of great influence in the joining or sealing of plastics.

The plungers used in the commercial applications of this invention are usually of aluminum, nickel or steel and are electrically heated to temperatures of six hundred or more degrees Farhenheit. Such heated plungers prove to be self-cleaning on the common thermoplastics such as polyethylene and polypropylene.

The method of joining at least two plies of thermoplastic material as exemplified in the steps shown in FIGS. 10–20 includes the arranging and holding of the sheets or laminae of plastic on a cooled platen. A heated plunger 52 is then advanced at a selected rate into the plastic sheets whereupon the thermoplastic in contact with the plunger is melted and as the plunger is advanced the plastic is commingled and under hydraulic pressure "counterflows" up the sides of the plunger and also into lateral portions between face-to-face plies of plastic. The plunger is then stopped at a point at or near cooled platen 40 whence the plunger is withdrawn and the melted plastic is permitted to cool to form a tubular plastic weld.

In the joining shown in FIGS. 21–23 the two opposed plungers are moved toward each other and as they approach each other the distal end or tip of each plunger is usually cooled by the discharge of heat into the plastic. For this reason the dual plunger operation is used wherein each plunger acts as a platen for the support of the plastic against the thrust of the other plunger. It is to be noted that, if desired, this same sandwich weld as shown in FIG. 23 could be accomplished by welding plies 148, 147 and 146 in the manner of FIGS. 10–20, and then the welded laminae be turned over. Plies 142, 144 and 145 are then placed on the welded laminae. A heated plunger as for example 152b is then advanced in the manner of FIGS. 10–20 a sufficient amount to weld 142, 144 and 145 to each other and to cause the weld now formed to commingle with the prior weld formation of plies 148, 147 and 146.

It is to be noted that coatings on plies of thermoplastic material may be dissimilar to the plies of plastic being welded however these coatings must be thin enough so that as the weld is being made they are dispersed and become encapsulated in a matrix of plastic melted from the heavy plies of material. If, for example, the plies of thermoplastic 42, 44, 46, 47 and 48 are made of polyethylene or polypropylene the film on facing surfaces often may be of vinyl or Saran usually of less than one thousandths of an inch in thickness.

PROCESS

The method of making the weld shown and described above includes the steps of arranging in face-to-face relationship the plies of thermoplastic which plies may be the same or dissimilar material. These layers of plastic may be sheets or moldings and are supported and held on a platen in a preselected manner and spacing to each other. The holding of these plies may be by a clamp plate having apertures for the passing of a heated plunger through the aperture. This plunger is advanced into the thermoplastic sheets at a predetermined rate and as it is advanced it causes a melting of the thermoplastic material that comes in contact with the plunger. The melted viscous plastic through "counterflow" commingles the melted plastic and when the plunger is stopped and withdrawn the melted plastic is allowed to cool and set to form a tubular weld.

The plunger is preferably heated to a temperature which is two hundred to three hundred degrees Fahrenheit above the melting point of the thermoplastic plies. The weld so formed may be smoothed by pressing the bead with a plate or other flat member to force the bead into the hole left by the withdrawn plunger.

The spacing of the welds may be such that a hermetic seal is effected by the lateral flow of viscous melted plastic into the joint contact portion between the various plies.

The method of fastening thermoplastic plies to each other requires relatively conventional apparatus arranged to produce the novel weld described above. In this description the terms "up," "down," "bottom," "lateral" and similar terms are applicable to the method described in conjunction with the accompanying drawing and it is to be noted that such terms are merely for the purpose of description and do not necessarily apply to a position in which the apparatus and product may be constructed or used.

While we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent processes.

Having described our invention herein, what we claim as new and desire to secure by Letters Patent is:

1. The method of joining at least two plies of thermoplastic material to one another at portions other than their edges, the method including the steps of:
   (a) arranging on a support platen and in layers in a preselected position a plurality of thermoplastic sheets;
   (b) cooling the support platen to a temperature less than the melting point of the thermoplastic sheets being joined;
   (c) holding said layers of thermoplastic material on the platen and in a substantially face-to-face relationship to one another;
   (d) advancing at a predetermined rate a flat tip of a heated plunger to and into the thermoplastic material;
   (e) melting the thermoplastic material coming in contact with and in close proximity to the flat tip of advancing heated plunger and in the predetermined advancing of the plunger to provide a counterflow and to commingle the melted material;
   (f) stopping the advance of the tip of the heated plunger so that the distal tip end of the plunger has advanced at least part way into the bottommost layer of material and to a point which may be contiguous to the platen;

(g) withdrawing the heated plunger tip from the plastic layers; and (h) cooling the melted portion of commingled plastic to provide a tubular weld.

2. The method of joining thermoplastic plies as in claim 1 in which the holding of the layers of plastic is by means of a clamp plate having apertures therein for the passage therethrough of the heated plunger.

3. The method of joining a plurality of plies of thermoplastic material to one another at portions other than their edges. The method including the steps of:

(a) arranging on a support platen and in layers and in a preselected spacing and position a plurality of thermoplastic sheets;

(b) cooling the support platen to a temperature less than the melting point of the thermoplastic sheets being joined;

(c) holding said layers of thermoplastic material on the platen and in a substantially face-to-face relationship to one another;

(d) advancing at a predetermined rate a tip of a heated plunger through the first ply and at least partially into the second ply of thermoplastic sheet the tip having its outer perimeter lying generally in a common plane;

(e) melting the thermoplastic material coming in contact with the flat tip of the advancing heated plunger;

(f) forcing the melted plastic to flow up the sides of the advancing plunger and into the existing voids at the juncture of the plies;

(g) stopping the advance of the heated plunger at a selected point which is at least past the juncture of the outermost and adjacent ply;

(h) withdrawing the heated plunger from the plastic layers; and (i) cooling the melted portion of commingled plastic to provide a tubular weld.

4. The method of joining thermoplastic plies as in claim 3 in which the plane of the outer perimeter of the tip is substantially at right angles to the axis of movement of the plunger.

References Cited
UNITED STATES PATENTS

| | | | |
|---|---|---|---|
| 2,322,298 | 6/1943 | Johnston | 156—306 |
| 2,545,243 | 3/1951 | Rumsey | 156—253 |
| 2,720,247 | 10/1955 | Richens | 156—290 |
| 2,974,717 | 3/1961 | Lindsay | 156—510 |
| 2,999,042 | 9/1961 | Meister | 156—290 |
| 3,075,573 | 1/1963 | Piazze | 156—513 |
| 3,287,195 | 11/1966 | Piazze | 156—251 |
| 3,325,331 | 6/1967 | Schwanekamp et al. | 156—290 |

DOUGLAS J. DRUMMOND, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,088                          September 17, 1968

William E. Young et al.

It is certified that error appears in the above identified patent and that said Letters Patent are hereby corrected as shown below:

In the heading to the printed specification, lines 3 to 6, "William E. Young, 52 Sea Beach Drive, Stamford, Conn. 06902; Robert O. Wolfelsperger, 23 Glenroy Road, Fairfield, N. J. 0700 and Patrick J. Pinto, 73 Ozone Ave., Cedar Grove, N. J. 07009" should read -- William E. Young, Stamford, Conn., Robert O. Wolfelsperger, Fairfield, and Patrick J. Pinto, Cedar Grove, N. J., said Wolfelsperger and said Pinto assignors to said Young --. Column 4, line 63, "real" should read -- reel --.

Signed and sealed this 3rd day of March 1970.

(SEAL)
Attest:

Edward M. Fletcher, Jr.                       WILLIAM E. SCHUYLER, JR.

Attesting Officer                               Commissioner of Patents